Jan. 4, 1949.　　　　　W. R. SWENSON　　　　　2,458,115
CONTROL OF ION EXCHANGE SYSTEMS
Filed Aug. 2, 1947　　　　　　　　　　　　　　3 Sheets-Sheet 1
FIG. 1.
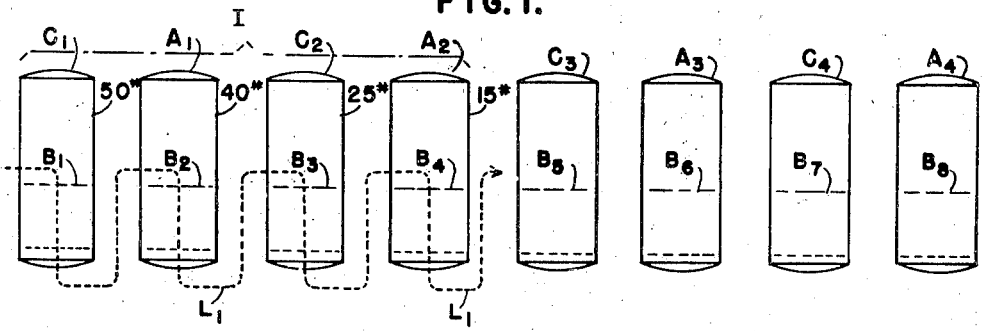
FIG. 2.
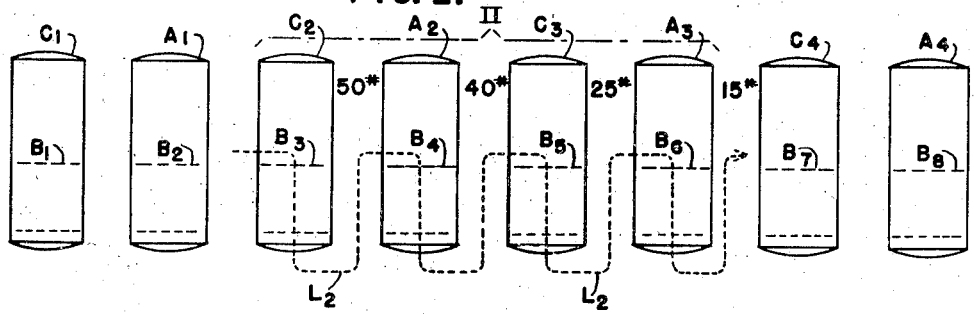
FIG. 3.
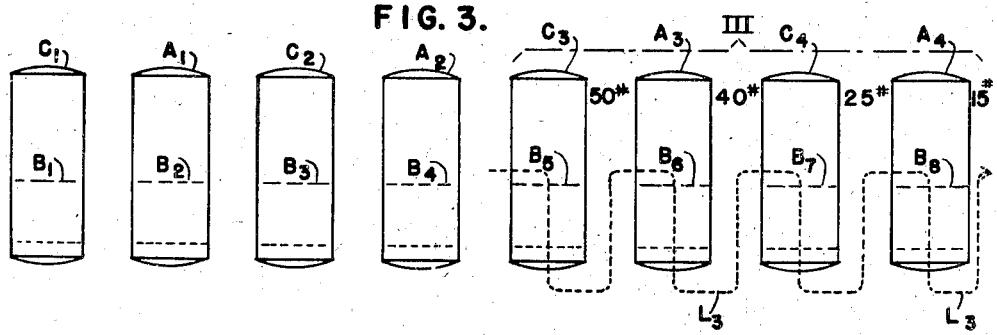
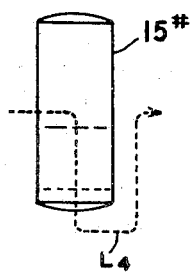
FIG. 4.
INVENTOR
WALTER R. SWENSON,
BY
ATTORNEY Jan. 4, 1949.  W. R. SWENSON  2,458,115
CONTROL OF ION EXCHANGE SYSTEMS
Filed Aug. 2, 1947  3 Sheets-Sheet 2

INVENTOR
WALTER R. SWENSON,
BY
ATTORNEY

Jan. 4, 1949.   W. R. SWENSON   2,458,115
CONTROL OF ION EXCHANGE SYSTEMS
Filed Aug. 2, 1947   3 Sheets-Sheet 3
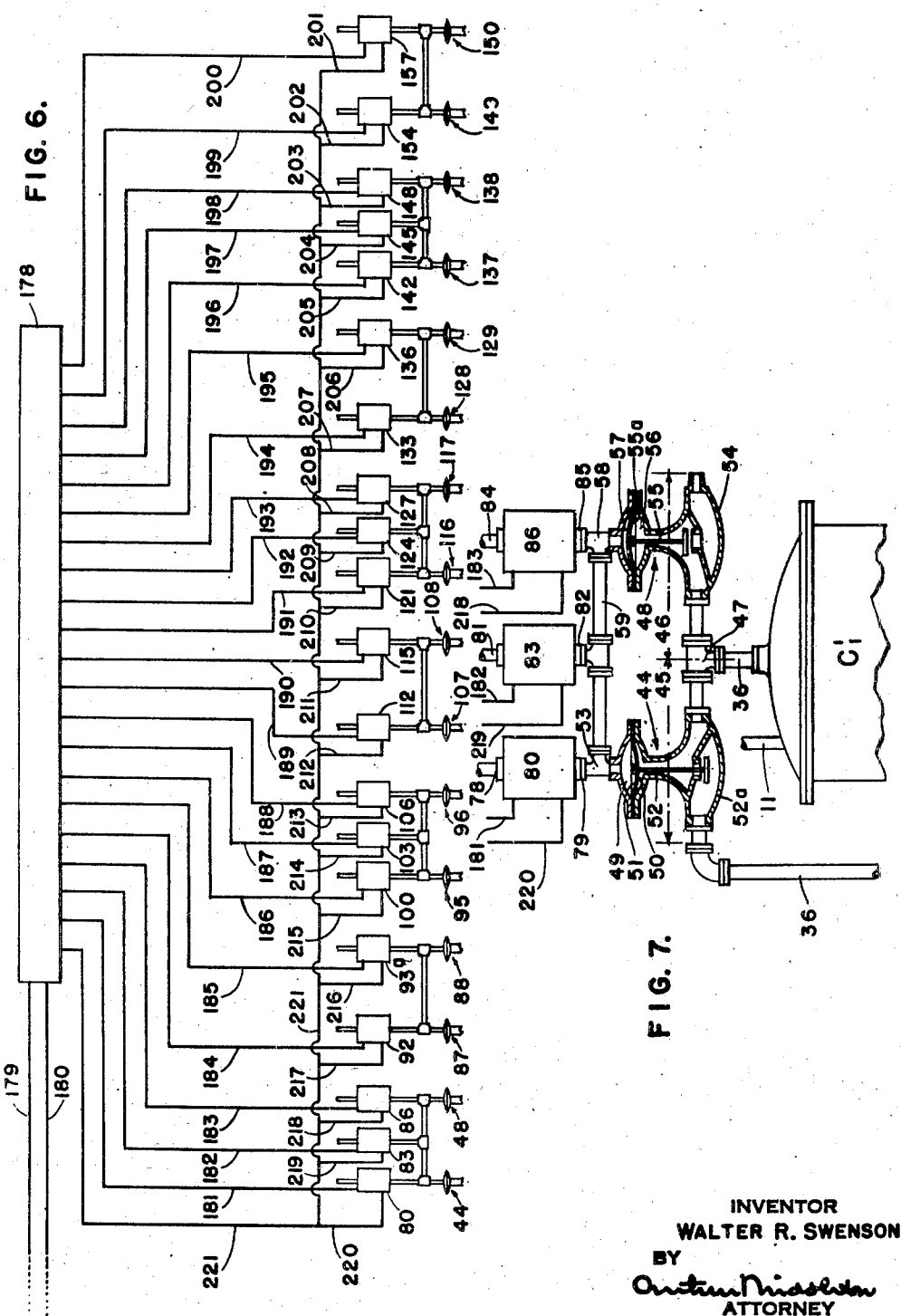
INVENTOR
WALTER R. SWENSON,
BY
ATTORNEY Patented Jan. 4, 1949

2,458,115

UNITED STATES PATENT OFFICE 2,458,115

CONTROL OF ION EXCHANGE SYSTEMS

Walter R. Swenson, Flushing, N. Y., assignor to The Dorr Company (Inc.), New York, N. Y., a corporation of Delaware Application August 2, 1947, Serial No. 765,683

4 Claims. (Cl. 210—24)

This invention relates to the operation of beds of ion exchange material and more specifically to the operation of exchange beds that are contained in closed containers or tanks, so-called ion exchange cells, in which the bed of material must be kept in submergence by the liquid passing downwardly through the bed.

A requirement in the operation of such closed cells is that the bed should be kept not only submerged, but that the level of the submerging liquid should be prevented from rising substantially above the top level of the bed as well as from falling below the top level of the bed. This means that a volume of excess liquid must be prevented from building up above the bed, in order that excess detention of the liquid in the cell might be avoided, and further that the intermingling of one kind of solution with another solution might be minimized as and when these solutions are sequentially passed downwardly through the bed.

An example of an exchange operation requiring that the time of detention be kept at a minimum, is found in the problem of ionic purification treatment of sugar juice in the patent to Shafor No. 2,365,221 as well as in the copending patent application of Campbell, Serial No. 620,723, filed October 6, 1945, both the patent and the application disclosing devices for automatically maintaining the liquid level close to or at the top level of a bed of exchange material in a closed cell. The copending Campbell application discloses a float-controlled device which automatically adjusts the level in the cell within predetermined limits by automatically opening or throttling the effluent valve of the cell, while a constant auxiliary pressure is being automatically maintained on the liquid level in the cell. The float device operates in a compensatory fashion whereby it increases the flow resistance of the valve by throttling it whenever there occurs an undue drop of the liquid level, while it decreases the resistance offered by the valve whenever there occurs an undue rise of the liquid level in the cell. Otherwise expressed this means that the total flow resistance of a cell which must be balanced by the air pressure in the cell is presented by the sum total of the flow resistance of the bed and the flow resistance of the valve and its associated connections. The compensatory correction operates either to effect a lowering of the valve flow resistance to the extent that the bed flow resistance increases or to cause a raising of the valve flow resistance to the extent that the bed flow resistance decreases.

For example, the flow resistance of a bed may increase where liquid flowing downwardly through the bed causes compacting thereof as well as a deposit of solid phase matter on the granules of the bed or in the void spaces between the granules. Such solids or solid impurities are usually washed out of the bed prior to its regeneration by means of an upflow of washwater through the bed. Changes in flow resistance may also occur with changes in flow volume or flow velocity of the liquid passing through the bed.

According to this invention a problem lies in establishing a simple and reliable control system for operating a cell through a sequence of periods or phases, each of which requires a different constant basic air pressure to be maintained upon the liquid level in the cell. The respective basic pressures may differ substantially from one another either upwardly or downwardly in accordance with similar changes of the flow resistance which they must balance. Hence the problem is to establish and automatically maintain a constant basic air pressure of a different order for each respective operating period, while the float-controlled device of the cell operates concurrently in a manner of a fine adjustment or control, that is to say in a manner of what might figuratively be called a micrometer adjustment upon the previously established basic pressure.

A condition requiring periodically the establishing and maintaining of a different basic air pressure in the cell is encountered in those exchange operations where the liquid passes through a series or line of beds or cells, and where these cells must be changed or switched with respect to their position in the line whereby a downstream cell is moved to an upstream position. That is to say, in accordance with the position which the cell assumes in the line a corresponding basic air pressure must be established and maintained constant in a cell for the duration of that position. In other words, the basic pressure in the cell must be changed in accordance with the change of flow resistance resulting from a change of position of the cell.

It is one of the objects of this invention to provide a simple and reliable control system in which basic or primary control means are operatively combined or coordinated with fine- or secondary liquid level control devices. To this end, in order to raise the basic pressure in a cell of the line, this invention proposes to provide in the air pressure supply system a reverse-acting diaphragm controlled admission valve of each cell. The term reverse-acting herein means that the one or inner side of the diaphragm is under the pressure of the air or gas in the cell from the downstream side of the valve whereby the diaphragm is influenced in a valve-closing sense. The other or outer side of the diaphragm can be placed selectively under any one of a number of predetermined basic pressures derived from an auxiliary pressure fluid supply, balancing the cell air pressure in a valve-opening sense. That is to say, the auxiliary fluid pressure can be selectively admitted to the diaphragm through any one of a number of pre-set automatic pressure-regulating valves or reduction valves which are provided in respective parallel auxiliary headers of an auxiliary fluid supply. Parallel auxiliary branches leading in turn from the headers supply the respective selective pressure to the outer side of the diaphragm of the admission valve. Thus, by closing all but a selected one of the auxiliary branches associated with a cell a desired predetermined basic air pressure can be selectively established in that cell.

In order to lower the basic pressure in a cell of the line, this invention provides a right-acting diaphragm-controlled air release or exhaust valve for each cell. The term right-acting herein means that the pressure of the air or gas in the cell acts upon the one or inner side of the diaphragm in a valve-opening sense, this pressure being opposed or balanced by the selected auxiliary pressure acting upon the opposite or outer side of the diaphragm.

The reverse-acting pressure admission valve together with the right-acting pressure release valve allows a selected basic pressure to be maintained in the cell within narrow limits. Thus each cell of the line is provided with a pair of diaphragm-controlled valves, namely, an inlet- and an exhaust valve, all of the diaphragm-controlled valves of all the cells being master-controlled by only one set of selective reduction valves each of which represents one predetermined basic pressure to be selectively established in the cell.

Associated with these primary or basic pressure control means are secondary- or fine control means capable of automatically applying correctives or adjustments to the flow resistance at the effluent end of the cell in response to variations of the liquid level in the cell.

According to one feature of the fine-control means are substantially in the nature of those disclosed in the copending Campbell patent application Serial No. 620,723, that is a float-controlled device influenced by the liquid level governs auxiliary fluid pressure acting upon a diaphragm-controlled valve placed in the effluent connection of a cell.

According to another feature the auxiliary-pressure chambers of each pair of diaphragm-controlled valves of each cell have a pressure-equalizing interconnection to which lead parallel auxiliary branch supply connections or branches from respective auxiliary pressure fluid supply headers. Each of these auxiliary headers carries a predetermined pressure maintained constant by a pre-set pressure reduction valve. Each of the parallel auxiliary branches has disposed in it a solenoid-controlled valve for selectively opening or shutting the branches. By closing all but a selected auxiliary branch of a cell a corresponding pressure can be established in the cell.

According to another feature the solenoid-controlled valves are automatically master-controlled so that the cell pressures are automatically established as required by the cyclic operation or operating phases of the cells.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figs. 1 to 3 show diagrammatically the operation of a row of ion exchange cells operating in series, and illustrates the upstream shifting of the cells with respect to their operative position in the row; Fig. 1 showing a first set or combination of cells in series operation, Fig. 2 showing a second set or combination of cells in series operation, and Fig. 3 showing a third set or combination of cells in series operation.

Fig. 4 shows a single cell operation as when under regeneration.

Figure 5:
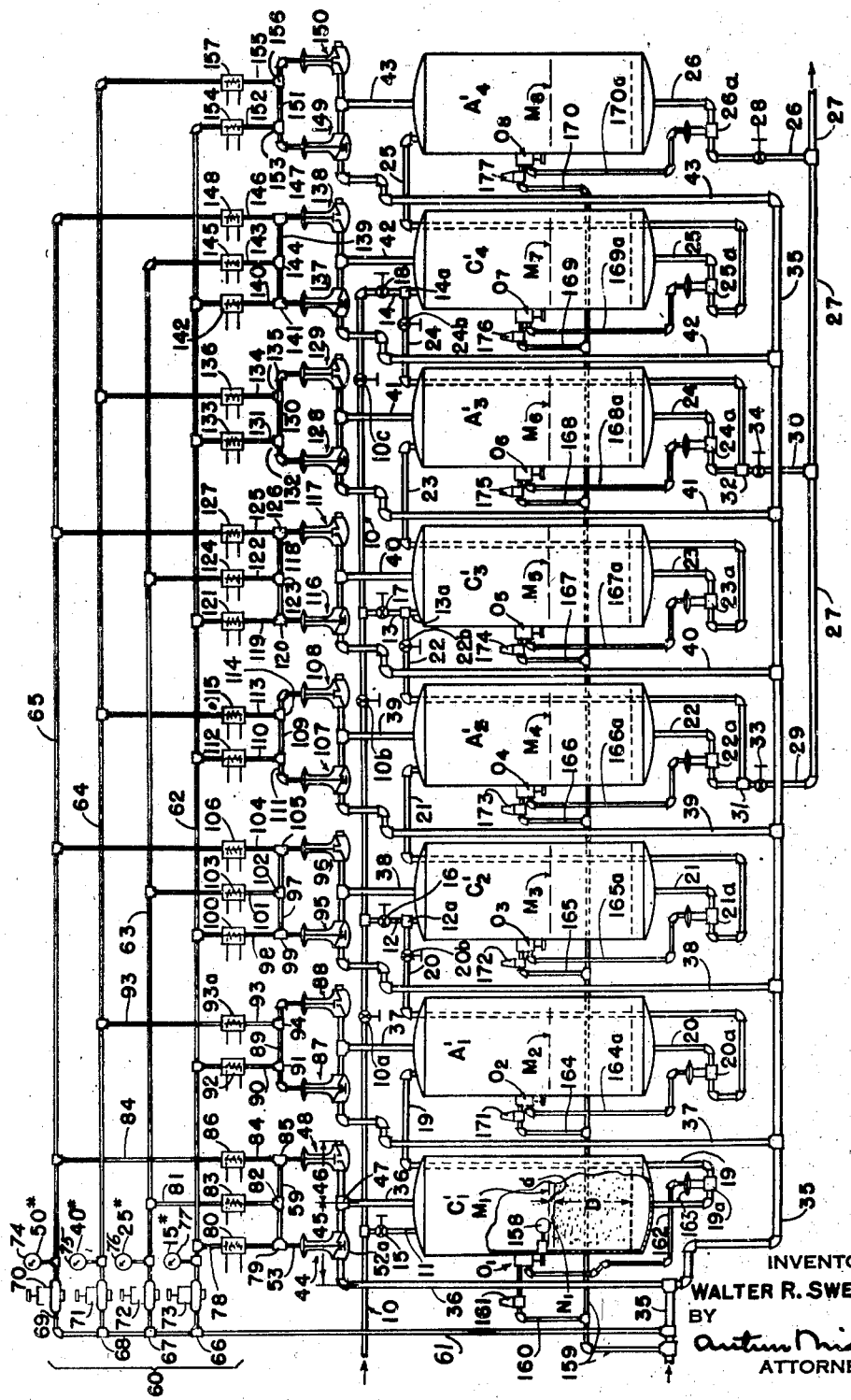
Fig. 5 shows the row of cells implemented with the liquid level and cell pressure control devices.

Fig. 6 indicates diagrammatically the provision of automatic means for coordinating and controlling the establishment of the different cell pressures.

Fig. 7 is an enlarged detail view of a pair of diaphragm-controlled valves associated with a cell.

As an example of the operation in series of a plurality of ion exchange cells there is herein presented (see Figs. 1 to 3) a row of eight cells comprising cation exchange cells and anion exchange cells in alternation. That is to say, this row comprises sequential pairs of cation- and anion exchange cells, such as the pairs $C_1$ and $A_1$, $C_2$ and $A_2$, $C_3$ and $A_3$, $C_4$ and $A_4$, a bed of granular ion exchange material being indicated in each cell as $B_1$, $B_2$, $B_3$, $B_4$, $B_5$, $B_6$, $B_7$ and $B_8$ respectively.

This example is based upon a 4-bed operation in which the liquid to be treated or ionically purified, such as a sugar-bearing liquid or sugar juice, is passed sequentially through two pairs of cation and anion exchange beds, such as the pair $C_1$ and $A_1$ and the pair $C_2$ and $A_2$. The passage of the liquid or sugar juice sequentially through these beds is shown in Fig. 1 by the dotted line $L_1$ in such a manner as to indicate that the beds are kept in submergence by the liquid passing therethrough. This first set of cells in operation is designated as I.

In accordance with the flow resistance encountered by the liquid in each cell, that is to say in accordance with the position of the respective cells in the line, each cell is to have a predetermined air pressure maintained in it to act upon the liquid level to substantially balance the flow resistance. Thus under the assumed flow conditions of Fig. 1 the cell $C_1$ is indicated to require a cell air pressure of 50#, the cell $A_1$ to require a cell air pressure of 40#, the cell $C_2$ to require a cell air pressure of 25#, and the cell $A_2$ to require a cell air pressure of 15#.

According to Fig. 2 the first pair of cells $C_1$ and $A_1$ having been exhausted is shown out of active operation, while a freshly regenerated pair of cells $C_3$ and $A_3$ has been added or placed in operation at the downstream end thereby in effect operatively shifting the only partially exhausted beds $C_2$ and $A_2$ to an upstream position. The now active set of four cells is designated as II, and the flow therethrough indicated by the dotted line $L_2$. Accordingly the required cell air pressure for cell $C_2$ is 50# as compared with the previously required 25#, the required cell air pressure for cell $A_2$ is 40# as compared with the previously required 15#, fresh cell $C_3$ is started at 25#, and fresh cell $A_3$ started at 15#.

According to Fig. 3 the cells $C_2$ and $A_2$ have been exhausted and are out of active operation, while a freshly regenerated pair of cells $C_4$ and $A_4$ have been added or placed in operation at the downstream end thereby in effect operatively shifting the only partially exhausted beds to an upstream position. The now operative set of cells $C_3$, $A_3$, $C_4$, $A_4$, is designated as III and the flow of liquid or sugar juice therethrough indicated by the dotted line $L_3$.

Fig. 4 represents a single cell which may be either of the cation exchange or of the anion exchange type, and assumed to be operatively detached while regenerant solution is being passed therethrough as indicated by the dotted line $L_4$, assumed to require a cell air pressure of 15# to approximately balance the single cell flow resistance.

Thus it will be seen that the cation exchange cells require variously air pressures of 50#, 25#, and 15#, while the anion exchange cells require either 40# or 15#.

A row of four pairs of exchange cells corresponding to those diagrammatically indicated in Figs. 1 to 3, is shown in Fig. 5, the first pair being $C_1'$ and $A_1'$, the second pair $C_2'$ and $A_2'$, the third pair $C_3'$ and $A_3'$, and the fourth pair $C_4'$ and $A_4'$. These cells are shown to be implemented in Fig. 5 by a pipe system for supplying to and passing through the cells the liquid or sugar juice to be treated, in the fashion diagrammatically represented in Figs. 1 to 3. These cells are furthermore shown to be operatively implemented by the showing of suitable compressed air pipe connections to supply air pressure to the cells, diaphragm-controlled valves in these connections, auxiliary valve-controlling air-pressure connections and pre-set pressure reduction valves and solenoid-controlled valves therein. The pre-set reduction valves furnish the predetermined cell air pressures, for example of such order as 50#, 40#, 25#, and 15# respectively.

Each cell also is provided with a liquid level responsive float device which by impulse through an auxiliary fluid pressure medium governs a diaphragm-controlled valve in the effluent connection of the cell, whereby the liquid level is automatically maintained within narrow predetermined limits as the valve is being opened or throttled in a compensatory fashion adjusting flow resistance in response to movements of the float in the float device.

The liquid supply system comprises a liquid or juice supply header 10 having supply branches 11, 12, 13, and 14 leading to the top portion or inlet end of the cells $C_1'$, $C_2'$, $C_3'$, and $C_4'$, these branches being provided with valves 15, 16, 17, and 18 respectively for opening or closing the branches. The header 10 has provided in it at certain points valves for opening and closing, one such valve 10a being disposed between branches 11 and 12, another such valve 10b being disposed between branches 12 and 13, and still another valve 10c being disposed between branches 13 and 14. An effluent pipe 19 leads from the bottom of cell $C_1'$ to the top of cell $A_1'$. An effluent pipe 20 leads from the bottom of cell $A_1'$ to the top of cell $C_2'$ joining branch 12 at 12a and having a valve 20a for opening or closing. An effluent pipe 21 leads from the bottom of cell $C_2'$ to the top of cell $A_2'$. An effluent pipe 22 leads from the bottom of cell $A_2'$ to the top of cell $C_3'$, joining the branch 13 at 13a and provided with a valve 22a for opening and closing. An effluent pipe 23 leads from the bottom of cell $C_3'$ to the top of cell $A_3'$. An effluent pipe 24 leads from the bottom of cell $A_3'$ to the top of cell $C_4'$, joining the branch 14 at 14a and provided with valve 24b for opening and closing. An effluent pipe 25 leads from the bottom of cell $C_4'$ to the top of cell $A_4'$. An effluent pipe 26 leads from the bottom of cell $A_4'$ to an effluent disposal header 27 and has a valve 28 for opening and closing. This effluent disposal header 27 is also joined by effluent disposal branches 29 and 30 leading from effluent pipes 22 and 24 respectively at points 31 and 32 thereof and provided with respective valves 33 and 34 for opening and closing.

The air pressure supply system comprises a main air supply header 35 having air supply branches 36, 37, 38, 39, 40, 41, 42 and 43 leading to the top of the respective cells. Each of these branches has in it a reverse-acting diaphragm-controlled valve such as exemplified by valve 44 disposed in the horizontal section 45 of branch 36. Each of these branches also has a horizontal length of pipe for exhaust or relief, herein termed the exhaust portion as exemplified by the portion 46 extending from a point 47 at the downstream side of valve 44, and provided with a right-acting diaphragm-controlled valve 48.

The reverse-acting valve 44 is herein understood to be one in which pressure from the downstream side of the valve acts upon the diaphragm in a valve-closing sense, whereas the right-acting valve 48 is understood to have pressure from the upstream side of it acting upon the diaphragm in a valve-opening sense.

For example the valve 44 has an outer pressure chamber 49 and an inner pressure chamber 50, both chambers being divided from each other by a diaphragm 51 (see detail Fig. 7) connected with a valve stem 52 operating in a valve housing 52a.

The outer pressure chamber 49 has a connection 53 for supplying thereto an auxiliary pressure fluid which may be air, to balance air pressure reaching the inner pressure chamber 50 from the downstream side of the valve. Thus if a predetermined or pre-set constant fluid pressure is maintained in the outer chamber 49 the valve will allow compressed air to pass into the cell until the pressure within the cell, that is the cell air pressure acting in the inner chamber 50, equals the pre-set pressure in the outer chamber. That is to say, the diaphragm 51 is deflected in accordance with pressure differentials between the two chambers, but closes when the differential disappears and the pressures are substantially equalized. Modifying adjustments upon the valve are, of course, possible.

The right-acting valve 48 is similar to the valve 44 in so far as it has a valve-housing 54, a valve stem 55 connected to and controlled by a diaphragm 55ª which represents a partition between an inner chamber 56 under cell air pressure from the upstream side of the valve and an outer chamber 57 under the same pressure as the outer chamber 49 of valve 44 because of a connection 58 communicating with connection 53 of valve 44 through an interconnecting pipe 59 to which various predetermined and pre-set fluid pressures can be selectively supplied from the auxiliary fluid pressure supply system roughly indicated as at 60.

For maintaining the cell air pressure the auxiliary pressure fluid supply system for valves 44 and 48 comprises an auxiliary supply header 61 branching off the main air supply header 35, and having in turn four auxiliary branch supply headers or sub-headers 62, 63, 64, and 65 leading from header 61 at points 66, 67, 68, and 69 respectively. These four sub-headers have reduction valves or devices 70, 71, 72, and 73 respectively pre-set to admit compressed air or pressure fluid to the extent that in the sub-headers there are maintained pressures, for example of 50 lbs. 40 lbs. 25 lbs. and 15 lbs. respectively, as indicated by pressure gauges 74, 75, 76 and 77.

Each of the sub-headers has a set of auxiliary supply branches for each cell whereby to supply a selected predetermined pressure to the outer pressure chambers of a selected pair of diaphragm-controlled valves of a cell. Each supply branch therefore has a valve for opening or closing, shown to be in the nature of a solenoid-controlled valve. By opening but one of such a set of solenoid-controlled valves associated with a cell, a selected predetermined pressure can be admitted to thereby establish a corresponding cell air pressure.

Accordingly, with respect to the operation of cell $C_1'$ a branch 78 leading from sub-header 62 joins the interconnecting pipe 59 at 79 and has a solenoid-controlled valve 80, a second branch 81 leading from sub-header 63 joins the interconnecting pipe 59 at 82 and has a solenoid-controlled valve 83, a third branch 84 leading from sub-header 65 joins the interconnecting pipe 59 at 85 and has a solenoid-controlled valve 86.

The cell $A_1'$ has associated with it a pair of diaphragm-controlled valves 87 and 88 which in their function correspond to that of valves 44 and 48 of cell $C_1'$. That is to say, the outer pressure chambers of the valves 87 and 88 are interconnected by a pressure-equalizing pipe 89. A branch 90 leading from the sub-header 62 joins the equalizing pipe 89 at 91 and has a solenoid-controlled valve 92. A second branch 93 leading from sub-header 64 joins the equalizing pipe 89 at 94 and has a solenoid-controlled valve 93ª.

The cell $C_2'$ has associated with it a pair of diaphragm-controlled valves 95 and 96 similar in function to the valves 44 and 48 of cell $C_1'$. That is to say, the outer pressure chambers of the valves 95 and 96 are interconnected by a pressure-equalizing pipe 97. A branch 98 leading from sub-header 62 joins the equalizing pipe 97 at 99 and has a solenoid-controlled valve 100. A second branch 101 leading from sub-header 63 joins the equalizing pipe 97 at 102 and has a solenoid-controlled valve 103. A third branch 104 leading from sub-header 65 joins the equalizing pipe 97 at 105 and has a solenoid-controlled valve 106.

The cell $A_2'$ has associated with it a pair of diaphragm-controlled valves 107 and 108 similar in function to the valves 44 and 48 of cell $C_1'$. That is to say, the outer pressure chambers of the valves 107 and 108 are interconnected by a pressure-equalizing pipe 109. A branch 110 leading from sub-header 62 joins the pipe 109 at 111 and has a solenoid-controlled valve 112. A second branch 113 leading from sub-header 64 joins pipe 109 at 114 and has a solenoid-controlled valve 115.

The cell $C_3'$ has associated with it a pair of diaphragm-controlled valves 116 and 117 similar in function to the valves 44 and 48 of cell $C_1'$. That is to say, the outer pressure chambers of the valves 116 and 117 are interconnected by a pressure-equalizing pipe 118. A branch 119 leading from sub-header 62 joins pipe 118 at 120 and has a solenoid-controlled valve 121. A second branch 122 leading from sub-header 63 joins pipe 118 at 123 and has a solenoid-controlled valve 124. A third branch 125 leading from sub-header 65 joins pipe 118 at 126 and has a solenoid-controlled valve 127.

The cell $A_3'$ has associated with it a pair of diaphragm-controlled valves 128 and 129 similar in function to the valves 44 and 48 of cell $C_1'$. That is to say, the outer pressure chambers of the valves 128 and 129 are interconnected by a pressure-equalizing pipe 130. A branch 131 leading from sub-header 62 joins pipe 130 at 132 and has a solenoid-controlled valve 133. A second branch 134 leading from sub-header 64 joins pipe 130 at 135 and has a solenoid-controlled valve 136.

The cell $C_4'$ has associated with it a pair of diaphragm-controlled valves 137 and 138 similar in function to valves 44 and 48 of cell $C_1'$. That is to say, the outer pressure chambers of the valves 137 and 138 are interconnected by a pressure-equalizing pipe 139. A branch 140 leading from sub-header 62 joins pipe 139 at 141 and has a solenoid-controlled valve 142. A second branch 143 leading from subheader 63 joins pipe 139 at 144 and has a solenoid-controlled valve 145. A third branch 146 leading from sub-header 65 joins pipe 139 at 147 and has a solenoid-controlled valve 148.

The cell $A_4'$ has associated with it a pair of diaphragm-controlled valves 149 and 150 similar in function to the valves 44 and 48 of cell $C_1'$. That is to say, the outer pressure chambers of the valves 149 and 150 are interconnected by a pressure-equalizing pipe 151. A branch 152 leading from sub-header 62 joins pipe 151 at 153 and has a solenoid-controlled valve 154. A second branch 155 leading from sub-header 64 joins pipe 151 at 156 and has a solenoid-controlled valve 157.

In cell $C_1'$ the liquid level $M_1$ shows as being maintained slightly above, that is an average relatively small distance "$d$" above the top level N of the bed of granular exchange material in the cell, the depth of which is designated as D. A liquid level controlling device associated with cell $C_1'$ comprises a float device influenced by and in turn controlling the liquid level $M_1$ is indicated collectively as $O_1$, having a float body 158 which moves in accordance with variations of the liquid level $M_1$. The movements of the float body 158 govern the supply of pressure or fluid or compressed air affecting the operation of the diaphragm-controlled liquid effluent valve 19ª. Thus, an undue rise of the body 158 with the liquid level will cause a degree of opening of the valve 19ª reducing the flow resistance sufficiently to allow the cell air pressure to depress the level. An undue drop of the body 158 with the liquid level will cause a degree of closing or throttling of valve 19ª increasing the flow resistance sufficiently to allow the liquid level to rise.

The control impulse is transmitted from the float body to the effluent valve $19^a$ through the medium of auxiliary compressed air supplied from a header 159 leading off the main air supply header 35 and through a branch 160 leading from the header 35 to the float device $O_1$ and having a pre-set pressure-reducing device or valve 161. A pipe 162 transmits controlled air pressure from the float device $O_1$ to a diaphragm pressure chamber 163 of valve $19^a$. The structural and operational details of the devices for thus maintaining control of the liquid level are set forth in the afore-mentioned copending patent application to Campbell.

Similarly, the liquid levels $M_2$, $M_3$, $M_4$, $M_5$, $M_6$, $M_7$, and $M_8$ are controllably maintained by the float devices $O_2$, $O_3$, $O_4$, $O_5$, $O_6$, $O_7$ and $O_8$ provided upon the other cells $A_1'$, $C_2'$, $A_2'$, $C_3'$, $A_3'$, $C_4'$, and $A_4'$ respectively, and controlling respective effluent valves $20^a$, $21^a$, $22^a$, $23^a$, $24^a$, $25^a$, and $26^a$. Accordingly, these float devices are supplied with auxiliary fluid pressure medium or compressed air by respective branches 164, 165, 166, 167, 168, 169, and 170 all leading from the header 159, and provided with respective pre-set pressure reduction devices or valves 171, 172, 173, 174, 175, 176, and 177, and governing the effluent valves $20^a$, $21^a$, $22^a$, $23^a$, $24^a$, $25^a$, $26^a$ through air pipe conduits $164^a$, $165^a$, $166^a$, $167^a$, $168^a$, $169^a$, $170^a$.

In Fig. 7 a centralized or automatic operating control or operative coordination of all the solenoid-controlled valves is diagrammatically indicated as by a central control station 178 having an electrical power supply indicated by conductors 179 and 180. Electrical conductors 181 to 200 lead from the station 178 to the respective solenoid-controlled valves to carry control impulses thereto, while electrical return conduits 201 to 220 join a common ground connection 221 leading to the station 178.

*Operation*

The operation of the apparatus shown in Figs. 5, 6, and 7 in accordance with the sequential operation of the ion exchange cells as diagrammatically represented in Figs. 1, 2, and 3 is as follows:

When in accordance with Fig. 1 the first group I of the cells $C_1$, $A_1$, $C_2$, $A_2$ are in productive operation, the liquid flow of valves $10^a$ and $10^b$ are closed but valves 15, $20^a$ and 33 are open, so that the liquid to be treated, for example sugar juice, passes from supply header 10 through branch 11, downwardly through cation exchange cell $C_1'$ and by way of the diaphragm-controlled effluent throttle valve $19^a$ through effluent pipe 19 up to and downwardly through the next cell, that is anion exchange cell $A_1$. From the bottom of this cell the juice passes by way of diaphragm-controlled effluent throttle valve $20^a$ up to and downawrdly through the next cell, namely cation exchange cell $C_2'$. From this cell the juice or liquid passes by way of the diaphragm-controlled effluent throttle valve $21^a$ through the effluent pipe 21 up to and then downwardly through the next and last cell of the now active group, namely the anion exchange cell $A_2'$. From this cell the thus treated or ionically purified sugar juice passes by way of the diaphragm-controlled valve $22^a$ and the effluent disposal branch 29 into the disposal header 27 to be subjected to whatever treatment steps are desired such as evaporation crystallization.

Concurrently with the passage of the juice sequentially through these four cells, there is automatically maintained in each cell an appropriate constant air pressure, for example of 50# in the first cell, of 40# in the second cell, of 25# in the third cell and of 15# in the fourth cell due to the respective automatic pressure reduction valves 70, 71, 72, and 73. Such pressure reduction valves are well-known pieces of equipment and as such are commercially available. The manner of controlling this cell air pressure is the same for all cells and it may be described by reference to Fig. 7 representing the pertinent portions and accessories of the first cell $C_1'$.

In that instance a suitable electrical control impulse from the central control station 178 closes the solenoid-controlled valves 80 and 83 while opening the solenoid controlled valve 86 admitting 50# auxiliary air pressure from sub-header 65 to the outer pressure chambers 49 and 57 of the diaphragm-controlled valves 44 and 48 by way of the equalizing pipe 59. If the cell pressure at that time is below 50# this will cause the valve 44 to open and the valve 48 to close, thus admitting through valve 44 compressed air from main header 35 through branch 36 until pressure in cell $C_1'$ also has reached 50# as the cell air pressure reacts equally upon the underside of both diaphragms 51 and $55^a$. If the cell air pressure should increase such as may be the case due to additional gases developing in the cell as a result of some chemical reactions, any pressure developing in excess of the predetermined desired cell pressure will act upon diaphragm 56 to open valve 48 sufficiently to allow excess air or gas to escape thereby restoring the cell air pressure to 50#.

If a lower cell air pressure should be required, for example 25#, a suitable impulse from the central control system 178 closes the solenoid-controlled valves 80 and 86 while opening the solenoid-controlled valve 83 admitting 25# auxiliary air pressure from sub-header 63 to the outer pressure chambers 49 and 57 of the valves 44 and 48. The respective automatic pressure reduction valve 72 maintaining the 25# pressure is of a kind that not only operates to keep up a desired predetermined pressure, but also to relieve excess pressure. Therefore the reduction valve 72 in this instance will act as relief valve to allow the 50 pressure trapped in the valve chambers to be reduced to the desired 25# which pressure is then further maintained by the reduction valve 72.

Similarly, a 15# pressure could be established in cell $C_1'$ by an impulse from the central control station 178 closing valves 83 and 86 and opening valve 80.

Cooperatively associated with the automatic maintenance of the basic air pressure in the cell there operates the level control device $O_1$ to maintain the liquid level $M_1$ sufficiently close to the bed of exchange material, so that the liquid level will not materially alter its distance "d" from the top level of the bed of exchange material whose depth is D.

Auxiliary pressure kept constant at a suitable value by reduction valve 161 is admitted to the pressure chamber of the diaphragm-controlled valve $19^a$ or is allowed to escape therefrom depending upon the governing position of the liquid level-controlled float 158. The net result of the float movements and of the associated devices is that the throttling action of valve $19^a$ is either increased or decreased as the case may be, an increase of the throttling action being due to a drop of the liquid level, and a decrease of the throttling action being due to a rise of the liquid level. Similarly the float devices $O_2$, $O_3$, $O_4$ maintain the liquid at the proper level by reacting upon the respective effluent valves $20^a$, $21^a$, $22^a$, and in cooperation with the means controlling the cell air pressures in the respective cells $A_1'$, $C_2'$, $A^{3'}$.

Next the first pair of cells $C_1'$ and $A_1'$ is operatively disconnected as for the purpose of regenerating the ion exchange material in them, and a pair of fresh cells $C_3'$ and $A_3'$ is added to cells $C_2'$ and $A_2'$ at the downstream end, thereby relatively shifting cells $C_2'$ and $A_2'$ to an upstream position. The resulting new operative group II of Fig. 2 then requires, for example 50# pressure for cell $C_2$, 40# pressure for cell $A_2$, 25# pressure for cell $C_3'$, and 15# pressure for cell $A_2'$.

The operating set-up according to Fig. 2 as applied to the apparatus of Figs. 5, 6, 7 would function as follows:

Cells $C_1'$ and $A_1'$ are now operatively disconnected from the productive operating set-up in the sense that they are having their exchange material regenerated. Cells $C_3'$ and $A_3'$ have been added at the downstream end of the line thereby in effect shifting the cells $C_2'$ and $A_2'$ to an upstream position.

Valves 15 and $20^b$ are closed, and valve $10^a$ is open. Valve 33 is closed, valve $22^a$ is open, valve 34 is open, valve $24^b$ is closed. Thus liquid from header 10 by-passes cells $C_1'$ and $A_1'$ and flows through valve $10^a$, and then through valve 16 in branch 12 to and downwardly through the cation exchange cell $C_2'$, thence through effluent pipe 21 by way of diaphragm-controlled effluent throttle valve $21^a$ to and through the anion exchange cell $A_2'$, thence through effluent pipe 22 by way of the diaphragm-controlled effluent throttle valve $22^a$ and valve $22^b$ to and through cation exchange cell $C_3'$, thence through effluent pipe 23 by way of the diaphragm-controlled effluent throttle valve $23^a$ to the anion exchange cell $A_3'$, and thence through the initial portion of effluent pipe 24 by way of the diaphragm-controlled effluent throttle valve $24^a$, and finally through effluent disposal branch 30 by way of valve 34 to the effluent disposal header 27 for whatever further treatment is desired.

The manner of control of the cell air pressures as well as of the liquid levels $M_3$, $M_4$, $M_5$, and $M_6$ in cells $C_2'$, $A_2'$, $C_3'$, $A_3'$ in the operating set-up of group II is similar to the controls described for the operating set-up described above for group I. That is the proper cell air pressure is maintained from the sub-headers 62, 63, 64 and 65 through impulses from the central control station 178 to the respective solenoid-controlled valves controlling respective pairs of diaphragm-controlled valves 95 and 96, 107 and 108, 116 and 117, 128 and 129 of respective cells $C_2'$, $A_2'$, $C_3'$, $A_3'$, as well as by respective float-control devices $O_3$, $O_4$, $O_5$, $O_6$ cooperatively connected with diaphragm-controlled valves $21^a$, $22^a$, $23^a$, $24^a$ respectively.

The operating set-up according to Fig. 3 as applied to the apparatus of Figs. 5, 6, 7 would function as follows:

The cells $C_1'$, $A_1'$, $C_2'$, $A_2'$ must now be assumed as being operatively disconnected from the productive operating set-up in the sense that they are having their exchange material regenerated. Cells $C_4'$ and $A_4'$ have been at the downstream end of the line thereby in effect shifting the cells $C_3'$ and $A_3'$ to an upstream position.

Valves 15, 16, 18, and $22^b$ are closed, valve 34 is also closed, valves $10^a$, $10^b$ and 17 are open, valve 34 is closed and valve 28 is open.

Thus liquid from header 10 by-passes cells $C_1'$, $A_1'$, $C_2'$, $A_2'$ and flows through valves $10^a$ and $10^b$ and through valve 17 in branch 13 to and downwardly through the cation exchange cell $C_3'$, thence through effluent pipe 23 by way of the diaphragm-controlled effluent throttle valve $23^a$ to and through the anion exchange cell $A_3'$, thence through effluent pipe 24 by way of the diaphragm-controlled effluent throttle valve $24^a$ and valve $24^b$ to and through the cation exchange cell $C_4'$, thence through the effluent pipe 25 by way of the diaphragm-controlled effluent throttle valve $25^a$ to and through the anion exchange cell $A_4'$, thence through the effluent pipe, or effluent disposal branch 26 by way of the diaphragm-controlled effluent throttle valve $26^a$ and through valve 28 to the effluent disposal header 27 for whatever further treatment is desired.

The manner of control of the cell air pressures as well as of the liquid levels $M_5$, $M_6$, $M_7$, $M_8$ in cells $C_3'$, $A_3'$, $C_4'$, $A_4'$ in the operating set-up of group III is similar to that employed for groups II and I. That is, the proper cell air pressure is maintained from the sub-headers 62, 63, 64, 65 through impulses from the central control station 178 to the respective solenoid-controlled valves controlling respective pairs of diaphragm-controlled valves 116 and 117, 128 and 129, 137 and 138, 149 and 150 of respective cells $C_3'$, $A_3'$, $C_4'$, $A_4'$, as well as by respective float control devices $O_5$, $O_6$, $O_7$, $O_8$ cooperatively interconnected with diaphragm-controlled valves $23^a$, $24^a$, $25^a$, and $26^a$ respectively.

I claim:

1. In combination with a plurality of closed ion exchange cells containing beds of ion exchange material in submergence and which are operable in selectively changeable sequence through which a liquid is sequentially passed, each of which cells has feeding means for supplying liquid to the bed and discharge means for discharging liquid from the bed whereby liquid is being passed through the bed, and also has automatic control means for maintaining the liquid level substantially constant at the top of said bed, a control system for maintaining the liquid level in each cell substantially at the top level of the bed, comprising a compressed air supply header having a supply branch for each cell leading to and into the respective top portion thereof to supply air pressure to the liquid level in the cell, each supply branch comprising an exhaust portion, a reverse-acting diaphragm-controlled valve in which gas pressure from the cell acts upon the inner side of the diaphragm in a valve-closing sense disposed in each said supply branch between said supply header and said exhaust portion, a right-acting diaphragm-controlled valve in which gas pressure from the cell acts upon the inner side of the diaphragm in a valve-opening sense disposed in said exhaust portion, the inner sides of the diaphragms of said valves being simultaneously and directly under the air pressure in the cell, an interconnecting pressure-equalizing conduit between the outer pressure chambers of the diaphragm-controlled valves of each cell, a plurality of auxiliary pressure fluid supply headers, a pressure reduction device disposed in each auxiliary header adapted to be pre-set for admitting a different predetermined fluid pressure into each auxiliary header, parallel branch connections between each of said auxiliary headers and each of said interconnecting conduits, and selectively operable shut-off means in each of said parallel branch connections.

2. A control system according to claim 1, in which the shut-off means comprise a solenoid-controlled valve.

3. A control system according to claim 1, in which said plurality of cells comprises pairs of cation exchange and anion exchange beds in series in which a pair of downstream cells is selectively operable in an upstream position.

4. A control system according to claim 1, in which a cell of said plurality is selectively shiftable to an upstream position.

WALTER R. SWENSON.

REFERENCES CITED

The following references are of record in the file of this patent:

UNITED STATES PATENTS

| Number | Name | Date |
| --- | --- | --- |
| 1,362,673 | Caps | Dec. 21, 1920 |
| 1,495,317 | Caps | May 27, 1924 |
| 1,759,636 | Turner | May 20, 1930 |
| 2,365,221 | Shafor | Dec. 19, 1944 |
| 2,404,367 | Durant | July 23, 1946 |
| 2,422,821 | Bhoota | June 24, 1947 |